US010503460B2

(12) United States Patent
Becker et al.

(10) Patent No.: US 10,503,460 B2
(45) Date of Patent: Dec. 10, 2019

(54) METHOD FOR SYNCHRONIZING AN ALTERNATIVE AUDIO STREAM

(71) Applicant: ORANGE, Paris (FR)

(72) Inventors: Claudia Becker, Rennes (FR); Benoit Besset, Thorigne Fouillard (FR); Michel Veillard, Bruz (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/779,675

(22) PCT Filed: Nov. 22, 2016

(86) PCT No.: PCT/FR2016/053038
§ 371 (c)(1),
(2) Date: May 29, 2018

(87) PCT Pub. No.: WO2017/089690
PCT Pub. Date: Jun. 1, 2017

(65) Prior Publication Data
US 2018/0329669 A1 Nov. 15, 2018

(30) Foreign Application Priority Data
Nov. 27, 2015 (FR) .................................... 15 61504

(51) Int. Cl.
G06F 3/16 (2006.01)
H04N 21/43 (2011.01)
(Continued)

(52) U.S. Cl.
CPC ........... *G06F 3/16* (2013.01); *H04N 21/4307* (2013.01); *H04N 21/4333* (2013.01);
(Continued)

(58) Field of Classification Search
CPC ............... H04H 20/18; H04N 21/4307; H04N 21/4333; H04N 21/8106; H04N 21/4394;
(Continued)

(56) References Cited

U.S. PATENT DOCUMENTS 5,940,135 A   8/1999  Petrovic et al.
6,630,963 B1  10/2003  Billmaier
(Continued)

FOREIGN PATENT DOCUMENTS

EP   2677764 A1   12/2013
WO   2012049223 A2   4/2012
WO   2013095893 A1   6/2013

OTHER PUBLICATIONS

International Search Report dated Jan. 30, 2017 for Corresponding International Application No. PCT/FR2016/053038, filed Nov. 22, 2016.
(Continued)

Primary Examiner — Andrew C Flanders
(74) Attorney, Agent, or Firm — David D. Brush; Westman, Champlin & Koehler, P.A.

(57) ABSTRACT

A method for synchronising a first audio stream, reproduced in the form of a sound signal by a reproduction device near a terminal, with an alternative audio stream received by the terminal. The terminal also receives a control stream representing the first audio stream reproduced on the reproduction device, the control stream and the alternative audio stream being synchronised according to a single time reference. the method includes: capturing a portion of the sound signal; transmitting to the reproduction device a command to suspend the reading of the first stream; obtaining a first data item representing at least one portion of the captured sound signal; detecting the first data item in the control stream and, when the first data item is detected in the control stream, transmitting to the reproduction device a command to
(Continued)

Figure 1:
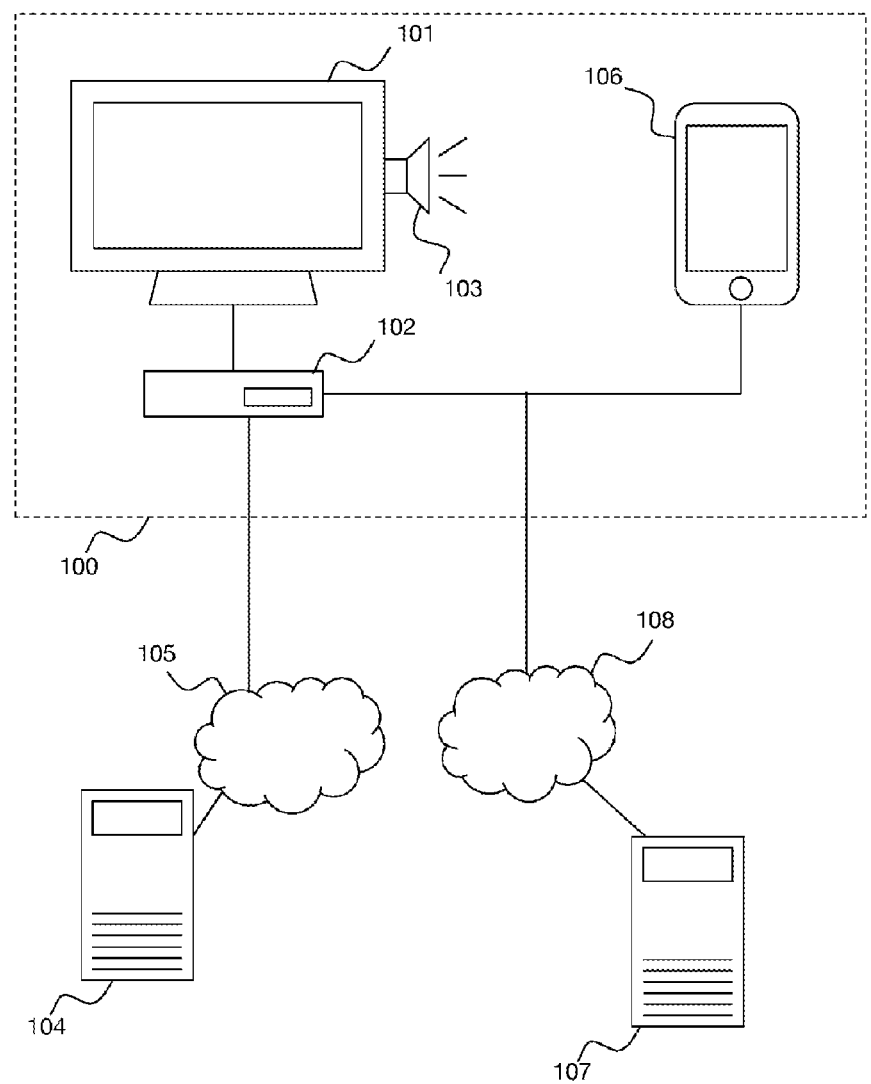

resume reading the first stream; and reproducing the alternative audio stream received by the terminal.

10 Claims, 5 Drawing Sheets

(51) Int. Cl.
    *H04N 21/433* (2011.01)
    *H04N 21/439* (2011.01)
    *H04N 21/81* (2011.01)
    *H04N 21/8547* (2011.01)

(52) U.S. Cl.
    CPC ..... *H04N 21/4394* (2013.01); *H04N 21/8106* (2013.01); *H04N 21/8547* (2013.01)

(58) Field of Classification Search
    CPC ....... H04N 7/52; G06F 17/30; G06F 17/3074; G06F 17/30017; G06F 17/28–289
    See application file for complete search history.

(56) References Cited

U.S. PATENT DOCUMENTS

| | | | |
|---|---|---|---|
| 2003/0200001 A1* | 10/2003 | Goddard | H04L 12/2803 700/94 |
| 2006/0149850 A1* | 7/2006 | Bowman | G11B 27/10 709/231 |
| 2008/0219641 A1* | 9/2008 | Sandrew | H04N 21/4307 386/201 |
| 2010/0023638 A1* | 1/2010 | Bowman | H04L 65/80 709/231 |
| 2011/0063503 A1* | 3/2011 | Brand | H04N 5/4401 348/500 |
| 2011/0289532 A1* | 11/2011 | Yu | H04N 21/4126 725/38 |
| 2012/0066594 A1* | 3/2012 | Gavade | H04N 21/2743 715/716 |
| 2013/0346631 A1* | 12/2013 | Gandhi | H04N 21/4126 709/248 |
| 2015/0154183 A1* | 6/2015 | Kristjansson | G06F 17/289 704/3 |
| 2015/0301788 A1* | 10/2015 | Johnston | G05B 15/02 700/94 |

OTHER PUBLICATIONS

English translation of the International Written Opinion dated Jan. 30, 2017 for Corresponding International Application No. PCT/FR2016/053038, filed Nov. 22, 2016.

* cited by examiner

METHOD FOR SYNCHRONIZING AN ALTERNATIVE AUDIO STREAM

CROSS-REFERENCE TO RELATED APPLICATIONS

This Application is a Section 371 National Stage Application of International Application No. PCT/FR2016/053038, filed Nov. 22, 2016, which is incorporated by reference in its entirety and published as WO 2017/089690 A1 on Jun. 1, 2017, not in English.

TECHNICAL FIELD

The present invention relates to the audiovisual field and relates more particularly to the techniques for accessing an alternative soundtrack in the broadcasting of an audiovisual program.

PRIOR ART

The digital video and audio broadcasting techniques these days offer the possibility for viewers to select different audio tracks when accessing an audiovisual program. For example, when accessing a VOD (Video On Demand in English) content or a "Live" content, a user can choose a language from a set of languages available in order to view the program in the original version, in the French version or in any other version offered by the broadcaster of the content. Thus, when an alternative audio track is selected, it replaces the audio track offered by default by the broadcaster of the content.

It may be, for example, when a content is accessed at home that the selected audio track does not suit all the people present. For example, a film in original version may suit adults but not suit any children who are watching the television at the same time. According to another case of use, it may be that a viewer watching a sports competition wants to listen to an alternative sporting commentary, not offered by the broadcaster of the content. For example, when the competition is broadcast live on television, a viewer can cut the sound on his or her television and listen to the commentary on a radio station offering another, live, commentary for the same sporting event. In such a case, the radio-transmission delays of the televized and radio programs being substantially different, the video contents played back on the television set and the audio content played back on a radio set are offset and do not make it possible to follow the program.

Similarly, this method also presents drawbacks when a viewer wants to access a greater variety of alternative audio contents by selecting, for example, a radio commentary broadcast on the Internet.

In effect, for different technical reasons, the transmission delays of such a content over the Internet network are greater than in the case of a conventional transmission by radio channel or by a dedicated communication network. Since the data packet routing delay is longer in the Internet network, a loss of synchronization of the content from the Internet relative to that broadcast on the television is observed, even when the contents are captured or produced synchronously. It is then not possible to listen to a sporting commentary broadcast over the Internet instead of the commentary offered on a television set, the commentaries then generally being delayed by several seconds relative to the video played back by the television set.

Techniques are known that make it possible to synchronize a content downloaded from the Internet with a televized program. For example, the European patent application EP 20130173023 describes a method that makes it possible to trigger, on a terminal, the playback of a complementary content synchronously with the playback of a stream by a playback device such as a television. Unfortunately, this method is not suitable for triggering the reading, on a first terminal, of a first alternative audio stream broadcast continuously, such as a stream broadcast according to a streaming method, when this first stream is injected into the network synchronously with a content intended to be played back on a playback device such as a television, and this first stream undergoes a delay during the transmission in the Internet network.

There is therefore a clear need to synchronize the reading of a stream currently being broadcast over a first network to a first terminal with the reading on a second terminal of a second stream currently being broadcast over a second network.

The invention improves this situation.

SUMMARY OF THE INVENTION

To this end, the invention relates to a method for synchronizing a first audio stream played back in the form of a sound signal by a playback device in proximity to a terminal with an alternative audio stream received by the terminal, the method being noteworthy in that the terminal also receives a control stream representative of the first audio stream played back on the playback device, the control stream and the alternative audio stream being synchronized according to a same time reference, and in that it comprises the following steps:

Capture of a part of the sound signal,
Emission, to the playback device, of a command to pause reading of the first stream,
Obtaining of a first datum representative of at least a part of the captured sound signal,
Detection of the first datum in the control stream, and
When the first datum is detected in the control stream:
Emission, to the playback device, of a command to resume reading of the first stream, and
Playback of the alternative audio stream received by the terminal.

Playback device should be understood to be a piece of equipment making it possible to play back an audiovisual content. It may for example be a television, a digital decoder associated with a television or even a "set top box" type unit. The terminal used to receive an audio stream replacing that played back on a television set or a decoder, receives at least two mutually synchronized streams. At least one of the streams, called control stream, is representative of one of the audio tracks of the program currently being broadcast on the television. At least one other of the streams received by the terminal is an audio track alternative to that broadcast on the playback device. The terminal thus receives the control stream with the same delay as the alternative stream. Since the control stream is comparable to the stream played back on the television, the terminal has a reference that makes it possible to align the alternative content with the broadcast content. The terminal captures, via a microphone of the terminal, a part of the sound signal played back by the playback device and computes a datum representative of the captured audio samples. The terminal then emits a command to the playback device in order to pause the playback of the audiovisual program. This pausing of the playback can for example be done via a "pause" function offered by the playback device or by the broadcasting network, during which the content currently being played back on the playback device is memorized in a memory until the reading resumes. When the datum representative of the captured audio samples is detected in the control stream, the streams are synchronized and the terminal emits a command to resume playback to the playback device and begins playback of the alternative stream on the terminal.

Thus, the invention allows the synchronization of an alternative stream received by a terminal through a first network with a stream played back on a playback device via a second network, when the alternative stream is received with a delay in relation to the stream played back on a playback device.

According to a particular embodiment, the method is such that the first representative datum is an acoustic imprint computed from at least a part of the captured sound signal.

An acoustic imprint makes it possible to uniquely identify a sound extract. The use of an acoustic imprint makes it possible to identify a sound extract from a playback device and locate this extract within another stream in order to estimate and compensate the offset between the two streams.

According to a particular embodiment, the method is such that it also comprises the following steps:

Obtaining, from the control stream, of a second datum representative of a part of the audio signal of which the control stream is representative, and memorizing of a first time stamp, Capture of the sound signal played back by the playback device, Detection of the second datum from the captured sound signal, and When the second datum is detected in the captured signal:

Determination of a second time stamp, and

Application of a delay to the alternative audio stream, the delay corresponding to the time interval between the first and second stamps.

The commands to pause and resume reading do not always offer the accuracy necessary for the perfect synchronization of the streams received on the terminal with those played back by the playback device. In order to mitigate this drawback, the method according to the invention proposes obtaining a datum representative of a part of the stream received by the terminal and searching for this imprint in the sound signal captured via a microphone of the terminal, in order to compute a possible delay of the playback device in relation to the streams received by the terminal. This delay is then applied to the streams played back by the terminal in order to improve the synchronization when the streams received by the terminal are in advance relative to the content played back by the playback device.

According to a particular embodiment, the method is such that the second representative data is an acoustic imprint computed from a part of an audio signal.

An acoustic imprint makes it possible to uniquely identify a sound extract. The use of an acoustic imprint makes it possible to identify a sound extract and locate it within another stream in order to estimate and compensate the offset between the two streams.

According to a particular embodiment, the method is noteworthy in that the control stream is an audio stream.

The control stream can be an audio stream corresponding to the content currently being played back on a playback device such as a television. Thus, the control stream can be a duplication of the soundtrack of an audiovisual content currently being played back. This control stream can then serve as a basis for the computation of an acoustic imprint which, when it corresponds to an acoustic imprint computed from the sound signal generated by the television, makes it possible to estimate and compensate the offset observed between the streams.

The control stream can also be a data stream comprising a succession of acoustic imprints precomputed from the soundtrack of the content currently being played back on the playback device. Such an arrangement avoids requiring the terminal to compute the imprint on the received control stream and lightens the processing operations required for the synchronization of the streams.

According to a particular embodiment, the method is such that a plurality of control streams are received by the terminal, the control streams corresponding to the audio tracks available on the playback device.

Conventionally, some playback devices offer the possibility to the users of selecting a particular audio track from a plurality of available audio tracks. For example, it is common practice for a digital decoder to allow a user to select a language from a set of available languages. The method provides for all the audio tracks made available to the user by the playback device to be also transmitted to the terminal in the form of a plurality of mutually synchronized control streams and with at least one alternative audio stream, the control stream from which data representative of sound extracts are obtained. The method thus allows the synchronization of an alternative stream received on the terminal with the content played back on the playback device, whatever the audio track selected on the playback device.

According to another aspect, the invention relates to a method for aligning a first audio stream played back by a playback device in proximity to a terminal with an alternative audio stream received by the terminal, the method being such that the terminal also receives a control stream representative of the stream played back on the playback device, the alternative audio stream and the control stream being synchronized according to a same time reference, and such that it comprises, on receipt of a message comprising an indication according to which the playback of the stream has been paused following the execution by a second terminal of the synchronization method, the following steps:

Obtaining, from the control stream, of a second datum representative of a part of the audio signal of which the control stream is representative, and memorizing of a first time stamp, Capture of the sound signal played back by the playback device, Detection of the second datum in the captured sound signal, and When the second datum is detected from the captured signal:

Determination of a second time stamp, and

Application of a delay to the alternative audio stream, the delay corresponding to the time interval between the first and second stamps, and Playback of the alternative audio stream received by the terminal.

When the playback is paused on the playback device, a message is sent to the terminals. This message comprises an indication according to which the playback of the first stream by the playback device has been paused following the prior execution of the synchronization method by another terminal. Such an arrangement advantageously allows a second terminal wanting to synchronize the reading of an alternative stream with the reading of a stream on the playback device, to dispense with the steps of capture of a part of the sound signal played back by the playback device, of emission of a command to pause the reading of the first stream, of detection of the first imprint and of emission of a command to resume the reading of the first stream.

According to another aspect, the invention relates to a device for synchronizing a first audio stream played back by a playback device in proximity with an alternative audio stream received by the device, the device being such that it also receives a control stream corresponding to the first audio stream played back on the playback device, the control stream and the alternative audio stream being synchronized according to a same time reference, and in that it comprises:

An audio interface, adapted to capture a part of the sound signal played back by the playback device, A communication interface, adapted to receive at least an alternative audio stream and a control stream and to emit, to the playback device, a command to pause the reading of the first stream, A signal processing unit, adapted to obtain a first datum representative of at least a part of the captured sound signal, A detector, configured to detect, in the control stream, the first computed imprint, The communication interface being also adapted to emit, when the first imprint is detected in the control stream, a command to resume the reading of the first stream to the playback device, and the audio interface being also adapted to play back the alternative audio stream received by the device.

The invention relates also to a terminal comprising a synchronization device as described previously.

The devices and terminals offer advantages similar to those of the method presented previously.

In a particular embodiment, the different steps of the method according to the invention are determined by instructions of computer programs.

Consequently, the invention also targets a computer program comprising instructions suitable for implementing steps of a method as described above, when the program is run by a processor.

This program can use any programming language, and be in the form of source code, object code, or intermediate code between source code and object code, such as in a partially-compiled form, or in any other desirable form.

The invention also targets a computer-readable storage medium on which is stored a computer program comprising instructions for the execution of the steps of the method.

The information medium can be any entity or device capable of storing the program. For example, the medium can comprise a storage means, such as a ROM, for example a CD ROM or a microelectronic circuit ROM, a flash memory, or even a magnetic storage means, for example a diskette (floppy disk) or a hard disk.

Also, the information medium can be a transmissible medium such as an electrical or optical signal, which can be routed via an electrical or optical cable, by radio or by other means. The program according to the invention can in particular be downloaded over a network of Internet type.

Alternatively, the information medium can be an integrated circuit in which the program is incorporated, the circuit being adapted to execute or to be used in the execution of the method concerned.

The various embodiments or features mentioned above can be added independently or in combination with one another, to the steps of the synchronization method.

LIST OF FIGURES

Figure 2:
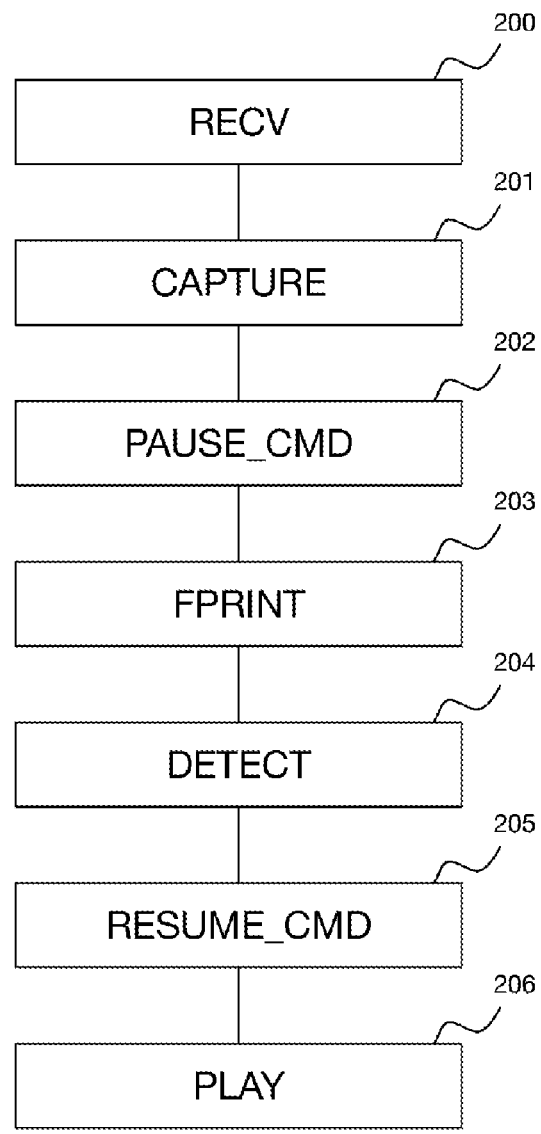
Figure 3:
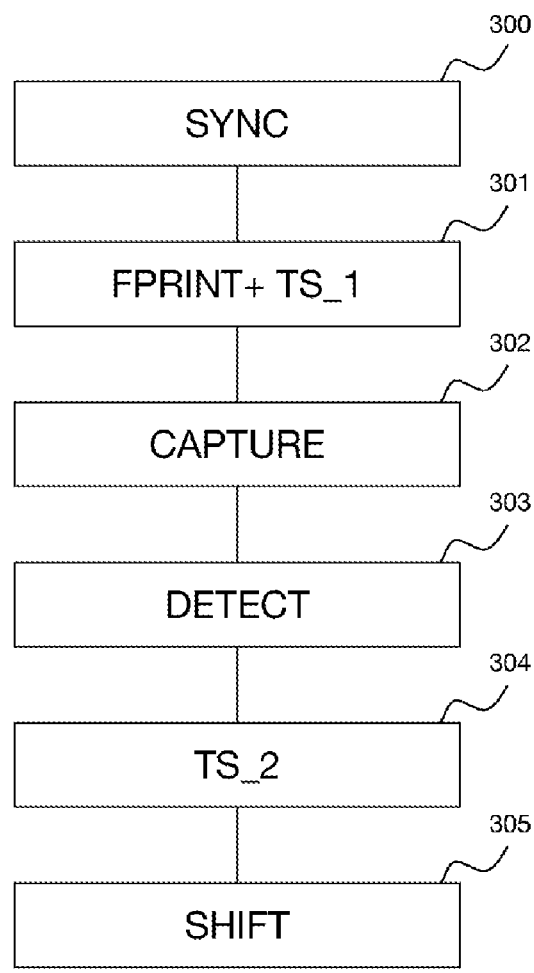
Figure 4:
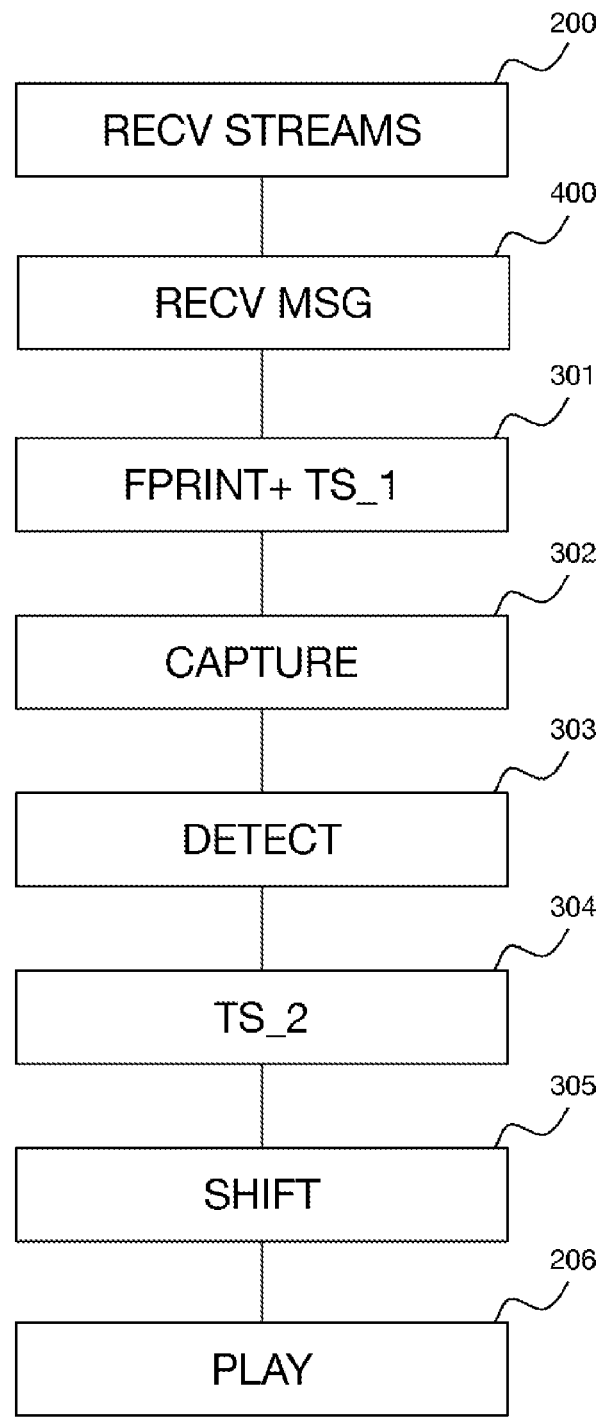
Figure 5:
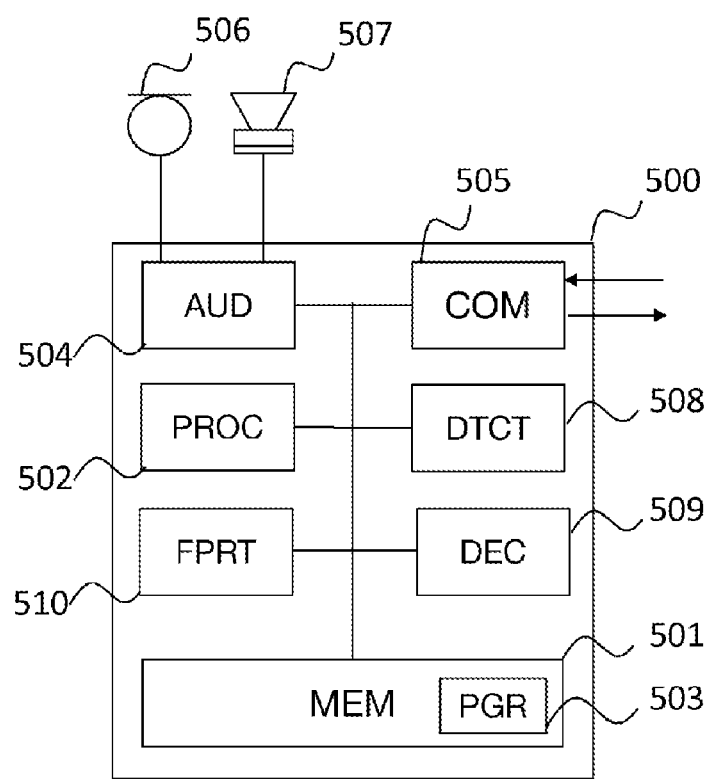

Other features and advantages will emerge from reading preferred embodiments described with reference to the figures in which:

FIG. 1 illustrates an architecture suitable for implementing the invention according to a particular embodiment, FIG. 2 illustrates the main steps of the synchronization method according to a particular embodiment of the invention, FIG. 3 illustrates the main steps of the synchronization method according to another particular embodiment of the invention, FIG. 4 illustrates the main steps of the alignment method according to a particular embodiment of the invention, and FIG. 5 illustrates the architecture of a device suitable for implementing the invention according to a particular embodiment.

DETAILED DESCRIPTION

FIG. 1 illustrates an architecture suitable for implementing the invention according to a particular embodiment. The architecture comprises a television 101 to which is connected a digital decoder 102. The television and the decoder constitute what will hereinafter in this description be called a playback device. Such a playback device is adapted to receive, decode and play back an audiovisual signal received via a communication network or by microwave or satellite broadcast. It is for example a television set connected to a terrestrial digital TV receiver or even a decoder of set top box type connected to a telecommunication network via a high bit rate network. The playback device thus allows a user to view contents broadcast by a content provider. The digital decoder 102 and the television set 101 can also be incorporated in one and the same item of equipment, such as a connected television or a personal computer. The decoder 102 comprises a functionality allowing the user to momentarily pause the playback of a content. The audiovisual content received is then memorized in a memory of the decoder so that a user can order the resumption of the playback without losing the content broadcast during the pause period. The user can then continue viewing with a delay. Such a functionality of pausing and resuming the reading with a delay is known and is generally accessible via a remote control associated with the decoder. Some decoders also offer access to this function through API (Application Programming Interfaces) which make it possible, for example, to control the decoder from applications developed on independent terminals, such as, for example, from a smartphone or a tablet.

In this example, the content played back on the playback device is broadcast by a broadcast server 104 through a multicast content distribution network 105.

The architecture of FIG. 1 also comprises a mobile terminal 106. It is, for example, a terminal of smartphone, tablet or personal assistant type or even a computer comprising a processing unit comprising a processor linked to one or more RAM (Random Access Memory) memories. The processor is configured to execute instructions loaded into the memory. In particular, the processor is adapted to execute instructions for decoding an audio content. The terminal also comprises a network interface adapted to exchange data with other terminals or servers via a wireless link of 3G, Wifi or Bluetooth type for example. With this communication interface, the terminal can in particular emit, through a local area network 100, commands to control the decoder 102 and receive, via the communication network 108, contents made available by a server 107. The terminal also comprises an audio interface adapted to convert digital signals into analog signals and vice versa. In particular, the terminal can capture and store, in the form of digital data, a sound signal from a microphone incorporated into the terminal and generate, from a digital audio content, a sound signal via a loudspeaker or individual earphones. The terminal 106 is thus adapted to download audio streams from the server 107, decode them and play them back continuously through a loudspeaker or a headset. The terminal 106 is also positioned in proximity to the playback device so as to be able to capture a sound signal generated by a loudspeaker 103 of the playback device.

The main steps of the synchronization method will now be described with reference to FIG. 2, according to a first embodiment of the invention.

In a first step 200, the terminal receives at least one alternative stream and at least one control stream synchronized according to a same time reference. The streams are for example received following a request sent by the terminal 106 to the server 107. For that, the terminal can download a file describing the streams available on the server 107, such as, for example, a so-called "manifest" file describing the available audio streams and the means for accessing them. After reading this file, the terminal simultaneously subscribes to all the audio streams, decodes them and offers the user the choice between all the versions available in the manifest. The streams are transmitted to the terminal via a continuous downloading protocol, such as, for example, according to the Microsoft™ "Smooth Streaming" protocol. Other streaming protocols can of course be used for the implementation of the invention, such as, for example, RTP/RTSP (Real Time Protocol/Real Time Streaming Protocol) or HLS (http Live Streaming). The audio stream received corresponds to an audio track selected by the user of the terminal 106 to replace the soundtrack of an audiovisual content currently being played back on the playback device. It concerns for example a dubbing in a language which is not available or which has not been selected on the playback device. The control stream is representative of an audio stream currently being played back on the playback device.

According to a particular embodiment of the invention, the control stream is an audio stream of a quality identical to the audio stream played back on the playback device. It can also be a copy of lesser quality of the audio stream played back on the playback device, encoded for example according to a different bit rate and/or format.

According to another particular embodiment, the control stream comprises data computed from the audio stream currently being played back on the playback device. It is for example a succession of imprints or signatures computed from at least one audio stream available for playback on the playback device.

The at least one audio stream and at least one control stream are synchronized according to a same time reference and broadcast simultaneously.

In the step 201, the terminal captures a part of the sound signal corresponding to the first audio stream played back by the playback device. The capture of the sound signal is performed using the audio interface and the microphone of the terminal. This step makes it possible to obtain a digital representation of a part of the sound signal generated by the playback device of a predefined duration, for example of a duration of a few seconds.

The terminal emits, in the step 202, a command to pause the playback of the content to the playback device when a part of the signal is captured. This command is emitted by using a communication interface of the terminal. For example, the command can be inserted into an http request emitted through a wireless connection of Wifi type and propagated to the playback device via a local area network to which the playback device is connected. The playback device can comprise a web server suitable for receiving such a request and interpreting commands included therein, and in particular a pause command inserted for example into a header or the body of the http request. According to another example, the command can be transmitted via an ad hoc Bluetooth connection. On receipt of such a command, the playback device pauses the playback and continues to receive the stream currently being played back. The data of the stream received are then memorized in a memory of the device so that the playback can subsequently resume and the content can be viewed in full. The web server of the playback device can then, according to a particular embodiment, emit a response to the terminal having emitted the request. The response received by the terminal can comprise an indication according to which the command to correctly been executed, or, if appropriate, an indication according to which the command has not been able to be executed.

The terminal then obtains, in a step 203, a first datum representative of at least a part of the sound signal captured in the step 201. According to a particular embodiment, such a representative datum is an acoustic imprint generated from the captured audio signal. Different methods for computing an imprint can be used to implement the invention. For example, the international patent application WO 2013095893 A1 describes a method for computing an acoustic imprint suitable for identifying a content broadcast continuously on a television. According to another example, the imprint can also be computed according to the method described in the European patent application EP 2677764 A1. Such an imprint computation algorithm can be implemented by a sequence of instructions executed by a processing unit of the terminal.

According to a particular embodiment, the first representative datum is a datum added to the audio signal and adapted to be retained upon the propagation of the sound signal, without being detectable to the human ear. The datum is then obtained by a signal processing operation applied to the samples received, making it possible to find the datum added to the signal. The U.S. Pat. No. 5,940,135 A describes such a technique. The representative datum can then be a synchronization information item associated with an extract of the audio signal, such as, for example, a time stamp or a unique identifier of the extract.

In the step 204, the terminal detects, in the control stream, the representative datum obtained. According to a particular embodiment, the control stream is an audio stream corresponding to the stream currently being played back on the playback device. The detection step then consists in searching in the control stream for the representative datum obtained in the step 203. For that, the terminal implements, from audio data decoded from the control stream, the same algorithm as that used in the step 203 in order to obtain a second datum representative of the stream. The datum is detected when the second representative datum corresponds to the datum obtained in the step 203. The step of computation and of comparison of the representative data is repeated for the new data received until the actual detection of the datum.

According to a particular embodiment, the control stream consists of a succession of data representative of the stream played back on the playback device. It can be, for example, a succession of precomputed imprints corresponding to different parts of the stream currently being played back on the playback device. Thus, the terminal does not have to compute the imprint, a simple comparison of the datum obtained in the step 203 with the data transmitted in the control stream is sufficient for the detection. The control stream can also consist of a series of synchronization information items corresponding to different sound extracts from the stream played back on the playback device. These synchronization information items can then be compared with those obtained in the step 203 from the sound signal captured to perform the detection.

When the first datum obtained in the step 203 is detected in the control stream in the step 204 the terminal emits, to the playback device, a command to resume the reading of the first stream in a step 205. The playback of the content on the playback device was paused on obtaining the first representative datum in the step 203. The detection of this first datum in the control stream indicates that the control stream is synchronized with the stream currently being played back on the playback device. Since the control stream is received by the terminal synchronously with at least one other alternative audio stream, the detection also indicates that the latter is also synchronized with the stream currently being played back on the playback device. The terminal then emits a command to resume the reading to the playback device and begins, in the step 206, the decoding and the playback, via a loudspeaker or a headset of the terminal for example, of the alternative audio stream received.

The method thus makes it possible to synchronize an alternative audio stream received on the terminal with an audiovisual content played back on a playback device, when the alternative stream is delayed relative to the audiovisual content.

It may be that the playback pause and resume functionality on the playback device does not offer sufficient accuracy to obtain a satisfactory synchronization. In this case, the latency relating to the processing of the command to resume reading can cause a delay in the playback of the content by the playback device relative to the streams received by the terminal.

The invention provides a solution to this drawback, according to a particular embodiment which will now be described with reference to FIG. 3.

The step 300 referenced in FIG. 3 comprises steps similar to the steps 200 to 206 described previously with reference to FIG. 2. In this step 300, the playback is momentarily paused on the playback device until the control stream received by the terminal is synchronized with the stream played back on the playback device. For that, the terminal computes, for example, an imprint from an extract of the sound signal emitted by the playback device and pauses the playback until this imprint is detected in the control stream received by the terminal.

In the step 301, the terminal obtains, from the control stream, a second datum representative of a part of an audio signal, and memorizes a first time stamp, the first time stamp corresponding for example to the instant of presentation of the last audio sample of the part of the audio signal that was used to obtain the second representative datum. The representative datum obtained corresponds for example to an acoustic imprint computed from a decoded extract from the control stream, when the control stream is an audio stream.

Such an imprint can for example be computed according to the technique described in the international patent application WO 2013095893 A1 or even according to the method described in the European patent application EP 267764 A1. When, according to a particular embodiment, the control stream is not an audio stream but consists, for example, of a succession of precomputed imprints or of synchronization information items, the obtaining of the second representative datum consists in reading the datum in the control stream.

The terminal, in the step 302, performs a capture of the sound signal generated by the playback device. For that, the terminal implements an audio acquisition interface comprising a microphone and a signal sampling module.

The terminal then detects, in the step 303, the representative datum in the captured signal. For that, according to a particular embodiment, the terminal can compute an imprint according to the same method as in the steps 302 and perform a comparison with the imprint obtained in the step 301. The steps of capture, of obtaining of a second representative datum and of comparison of this datum with that obtained in the step 301 are repeated from new samples captured as long as the datum obtained in the step 301 is not detected in the captured sound signal. When the second representative datum is detected, a time stamp corresponding, for example, to the instant of capture of the last sample used to obtain the second representative datum is memorized in the step 304. As a variant, the first and second time stamps can respectively correspond to the instants of reception and of capture of the first sample used to obtain the corresponding representative datum, the important thing being that the first and second stamps correspond substantially to the same sound extract in the captured signal and the control stream. The first and second stamps are obtained from a same clock of the terminal. Thus, the difference between the second and the first stamps corresponds to the offset observed between the playback of the audiovisual content by the playback device and the receipt of the control stream by the terminal.

In the step 305, the playback of the alternative audio stream received by the terminal is delayed by the offset value measured between the two stamps. For that, the data decoded from the second stream are memorized in a buffer memory of the terminal. According to a particular embodiment, the playback of the decoded samples is paused for a duration corresponding to the measured delay, the decoded samples being memorized in the buffer memory during the pause period. It is thus possible to compensate the delay to synchronize the content played back on the playback device with the alternate audio stream received by the terminal, with an accuracy which depends on the measurement of the delay. For example, when the delay is estimated by comparison of the imprints, the streams can be synchronized with an accuracy of the order of a few tens of milliseconds.

According to a particular embodiment, a plurality of control streams are received by the terminal, the control streams corresponding to the audio tracks available on the playback device. So as to be able to match a representative datum, such as an acoustic imprint characteristic of a part of the content currently being played back on the playback device, with a datum representative of a part of a control stream received on the terminal, the content played back on the playback device and that received by the terminal must correspond. Now, when several audio tracks, corresponding for example to several languages, are available for the content currently being played back on the playback device, the terminal has no a priori knowledge of the audio track selected by the user. Thus, the method according to the invention proposes that a plurality of control streams be received by the terminal, each control stream corresponding to an audio track available on the playback device. Thus, in the step 204, the first representative datum is detected in each of the control streams received by the terminal. The detection takes effect when the representative datum is detected in one of the control streams. Similarly, in the step 301, a second representative datum such as an acoustic imprint is obtained for each control stream received, these different data being compared in the step 303 with a datum obtained from the captured sound signal. Thus, it is possible to synchronize the content played back on the playback device with an alternative audio stream received by the terminal, whatever the language selected by the user on the playback device.

It may be that a second terminal tries to synchronize an alternative audio stream with a content currently being played back on a playback device while the synchronization method is already currently being executed on a first terminal. In this case, the second terminal can benefit, without executing them, from the steps 201 to 205 already performed or currently being performed by the first terminal. This other aspect of the invention relates to an alignment method which will now be described with reference to FIG. 4, according to a particular embodiment.

In a first step similar to the step 200 described with reference to FIG. 1, the terminal receives at least one alternative audio stream and at least one control stream representative of a stream currently being played back on a device, the received streams being synchronized with one another according to a same time reference.

In the step 400, the terminal receives a message comprising an indication according to which the playback of a content on the playback device is paused following the execution by a second terminal of the synchronization method. This message can be received following the emission of a command to pause the playback to the playback device, or else following the emission of a command to consult the status of the playback device. This message can also be broadcast by another terminal which executes the synchronization method. The receipt of this message informs the terminal that a certain number of steps, and in particular the steps 202 of pausing of the playback and 205 of resumption of the playback must not be performed because they would risk desynchronizing the first terminal. Thus, the playback of the content on the playback device does not have to be delayed.

The terminal then executes the steps 301 to 305 in accordance with those described previously with reference to FIG. 3, in order to align the alternative stream received with the content played back by the playback device.

When the alternative stream is aligned with the content currently being played back, the terminal can trigger the playback of the alternative stream in accordance with the step 206 described with reference to FIG. 1.

FIG. 5 illustrates, according to a particular embodiment of the invention, a device 500 implementing the synchronization method.

The device comprises a storage space 501, for example a memory MEM, a processing unit 502 equipped for example with a processor PROC. The processing unit can be driven by a program 503, for example a computer program PGR, implementing the synchronization method as described in the invention with reference to FIG. 2, and in particular the steps of receipt of an alternative audio stream synchronized with a control stream, of capture of a part of the sound signal played back by the playback device, of emission, to the playback device, of a command to pause the reading of the first stream, of obtaining of a first datum representative of at least a part of the captured sound signal, of detection of the first datum in the control stream, and, when the first datum is detected in the control stream, of emission, to the playback device, of a command to resume the reading of the first stream, and of playback of the alternative audio stream received by the terminal.

On initialization, the instructions of the computer program 503 are for example loaded into a RAM (Random Access Memory in English) memory before being executed by the processor of the processing unit 502. The processor of the processing unit 502 implements the steps of the synchronization method according to the instructions of the computer program 503.

For that, the device comprises, in addition to the memory 501, communication means 505, such as, for example, a wireless network interface COM, allowing the device to connect to a telecommunication network and exchange data with other devices via the telecommunication network, and in particular emit commands to pause and resume reading to a playback device and receive one or more streams currently being broadcast by a server. The device also comprises an audio interface 504 adapted to convert digital signals into analog signals and vice versa. In particular, the device can capture and store in the memory 501, in the form of digital data, a sound signal from a microphone 506 and generate, from a decoded digital audio content, a sound signal via a loudspeaker 507 or individual earphones. The device also comprises a processing unit 509 adapted to decode a compressed audio stream. The device is thus adapted to receive audio streams from the server, decode them and play them back continuously through a loudspeaker or a headset.

The device 500 also comprises a signal processing unit 510 adapted to obtain a datum representative of a part of an audio signal. For example, the unit 510 comprises a processor configured to execute instructions to compute an acoustic imprint representative of an extract of an audio signal captured by the microphone 506 and sampled by the audio interface 504, or else instructions to extract data added in a digital sound signal.

The device finally comprises a detector 508, configured to detect, in a control stream, an acoustic imprint computed by the processing unit 510. The detector can be implemented by a processor configured to execute instructions suitable for performing a comparison of two digital imprints.

The invention can be implemented on terminals of smartphone type, on tablets or personal computers and makes it possible to enrich the traditional television experience such as streaming, video on demand (VOD) or catch-up television.

The invention claimed is:

1. A method for synchronizing a first audio stream played back in the form of a sound signal by a playback device in proximity to a terminal with an alternative audio stream received by the terminal, the method comprising the following acts performed by the terminal:
   capturing a part of the sound signal,
   receiving a control stream representative of the first audio stream played back on the playback device, the control stream and the alternative audio stream being synchronized according to a same time reference,
   obtaining a first datum representative of at least a part of the captured sound signal, and
   prior to playing back the alternative audio stream received by the terminal:
      emitting, to the playback device, a command to pause reading of the first audio stream, detecting the first datum in the control stream, and
upon detection of the first datum in the control stream:
emitting, to the playback device, a command to resume reading of the first audio stream.

2. The method as claimed in claim 1, wherein the first representative datum is an acoustic imprint computed from at least a part of the captured sound signal.

3. The method as claimed in claim 1, further comprising:
obtaining, from the control stream, a second datum representative of a part of the audio signal of which the control stream is representative, and memorizing a first time stamp,
capturing the sound signal played back by the playback device,
detecting the second datum in the captured sound signal, and
when the second datum is detected in the captured signal:
determining a second time stamp, and
applying a delay to the alternative audio stream, the delay corresponding to the time interval between the first and second stamps.

4. The method as claimed in claim 3, wherein the second representative datum is an acoustic imprint computed from a part of an audio signal.

5. The method as claimed in claim 1, wherein the control stream is an audio stream.

6. The method as claimed in claim 1, wherein a plurality of control streams are received by the terminal, the control streams corresponding to the audio tracks available on the playback device.

7. A method for aligning a first audio stream played back in the form of a sound signal by a playback device in proximity to a terminal with an alternative audio stream received by the terminal, the method comprising:
the terminal receiving the alternative audio stream and receiving a control stream representative of the first audio stream played back on the playback device, the control stream and the alternative audio stream being synchronized according to a same time reference, and
on receipt of a message comprising an indication according to which playback of the first audio stream by the playback device has been paused, performing the following acts:
obtaining, from the control stream, a datum representative of a part of the audio signal of which the control stream is representative, and memorizing a first time stamp,
capturing the sound signal played back by the playback device,
detecting the datum in the captured sound signal, and
when the datum is detected from the captured signal:
determining a second time stamp, and
applying a delay to the alternative audio stream, the delay corresponding to the time interval between the first and second stamps, and
playing back the alternative audio stream received by the terminal.

8. A device for synchronizing a first audio stream played back by a playback device in proximity with an alternative audio stream received by the device, wherein the device receives a control stream corresponding to the first audio stream played back on the playback device, the control stream and the alternative audio stream being synchronized according to a same time reference, and wherein the device comprises:
an audio interface, adapted to capture a part of the sound signal played back by the playback device,
a communication interface, adapted to receive at least the alternative audio stream and a control stream,
a signal processing unit, adapted to obtain a first datum representative of at least a part of the captured sound signal,
a detector, configured to detect, in the control stream, the first datum,
wherein the communication interface is also adapted to, prior to playing back the alternative audio stream received by the terminal:
emit, to the playback device, a command to pause reading of the first audio stream;
upon detection of the first datum in the control stream by the detector, emit to the playback device a command to resume the reading of the first audio stream.

9. A terminal comprising the device as claimed in claim 8.

10. A non-transitory processor-readable information medium, on which is stored a computer program comprising instructions for executing a synchronization method when the program is run by a processor of a terminal, wherein the synchronization method comprises synchronizing a first audio stream played back in the form of a sound signal by a playback device in proximity to the terminal with an alternative audio stream received by the terminal, including the following acts performed by the terminal:
capturing a part of the sound signal,
receiving a control stream representative of the first audio stream played back on the playback device, the control stream and the alternative audio stream being synchronized according to a same time reference,
obtaining a first datum representative of at least a part of the captured sound signal, and
prior to playing back the alternative audio stream received by the terminal:
emitting, to the playback device, a command to pause reading of the first audio stream,
detecting the first datum in the control stream, and
upon detection of the first datum in the control stream:
emitting, to the playback device, a command to resume reading of the first audio stream.

* * * * *